No. 825,606. PATENTED JULY 10, 1906.
H. S. MILKS.
MEASURING IMPLEMENT.
APPLICATION FILED SEPT. 21, 1905.
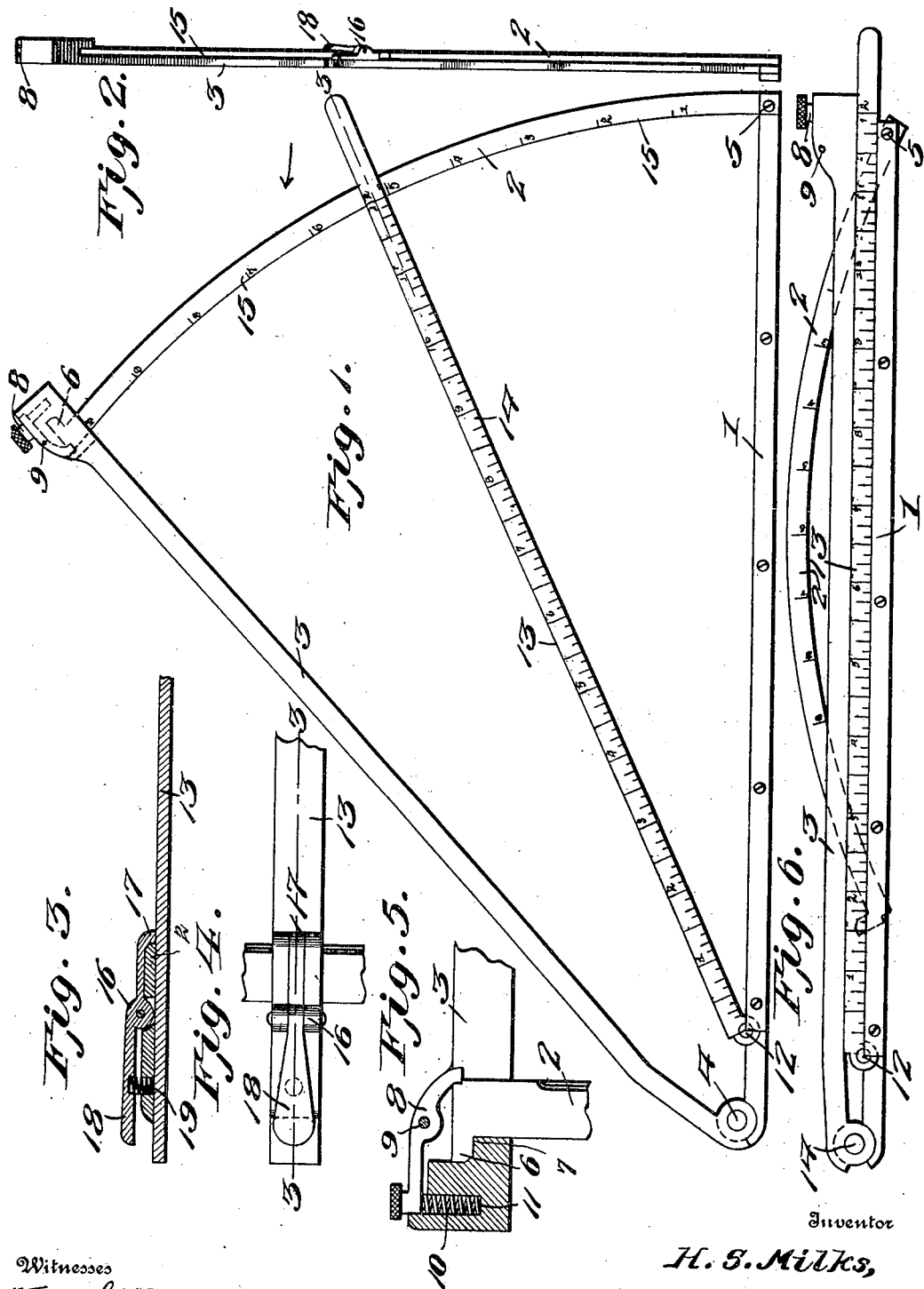
Witnesses
Frank B. Hoffman
G. A. Elmore
Inventor
H. S. Milks,
By Victor J. Evans
Attorney

UNITED STATES PATENT OFFICE.

HARRY S. MILKS, OF PARSONS, KANSAS.

MEASURING IMPLEMENT.

No. 825,606. Specification of Letters Patent. Patented July 10, 1906.

Application filed September 21, 1905. Serial No. 279,440.

*To all whom it may concern:*

Be it known that I, HARRY S. MILKS, a citizen of the United States, residing at Parsons, in the county of Labette and State of Kansas, have invented new and useful Improvements in Measuring Implements, of which the following is a specification.

This invention relates to measuring implements designed especially for use in building construction, and has for its objects to produce a comparatively simple inexpensive device of this character which may be readily folded for convenient transportation, one which affords an efficient means for quickly determining the pitch of a roof and the rise and length of the rafters, and one wherein the gage-bar may be quickly adjusted for measuring the rafters of a roof having a predetermined pitch and rise.

With these and other objects in view the invention comprises the novel features of construction and combination of parts more fully hereinafter described.

In the accompanying drawings, Figure 1 is an elevation of an instrument embodying the invention and showing the gage-bar adjusted for a roof having a five-inch rise. Fig. 2 is an edge view of the instrument looking in the direction indicated by the arrow in Fig. 1. Fig. 3 is a detail sectional view, on an enlarged scale, taken on the line 3 3 of Fig. 4. Fig. 4 is a detail side elevation, on an enlarged scale, showing the means for clamping the gage-bar. Fig. 5 is an enlarged detail view, partly in section, showing the corner-lock. Fig. 6 is an elevation showing the instrument in folded condition.

Referring to the drawings, it will be seen that the frame of the instrument, which when in open position is of substantially triangular form, includes a base-bar 1, an end member or bar 2, hereinafter termed the "rise-gage," and a connecting bar or element 3, which latter is hinged at 4 to one end of the base-bar, to the other end of which the gage 2 is hinged, as at 5, there being provided at the normally free end of the bar 2 a transversely-projecting portion or finger 6, designed to enter a suitable socket 7, formed at the free end of the connecting element 3, to which the free end of bar 2 is detachably engaged by means or a locking member 8, fulcrumed between its ends, as at 9, and pressed to locking position by means of a spring 10, housed in a socket 11, formed in the end of bar 3, as seen more clearly in Fig. 5.

Pivoted at one end at 12 to the base-bar 1 of the frame is a gage member or bar 13, graduated at 14 to indicate feet and fractions thereof and arranged for its free end to intersect and move in an arc over the end member 2, which latter is in the form of an arc struck from the pivot 12 as a center and is provided on that face over which the bar 13 moves with graduations 15, designed for determining the rise of a roof.

Pivoted to the free end of bar 13 and for engagement with the arc-shaped bar 2 is a locking member 16, having an engaging portion 17 and a finger-piece 18, between which latter and the bar 13 there is disposed a spring 19, which serves to press the member to locking position.

In practice when the instrument is employed for determining the pitch and rise of a roof the gage-bar 13 is adjusted to intersect the bar 2 at one of the graduations 15, as seen in Fig. 1, which graduations indicate the rise in inches of the roof relative to the length in feet of the rafters. For instance, with the gage-bar set at the numeral "5" the rise of the roof will be five inches to every foot length of the rafter. After the gage-bar 13 has been properly adjusted a vertical line indicating the center of the roof and drawn at right angles to bar 1 to intersect gage-bar 13 will show upon the latter and at the point of the intersection the appropriate length for the rafter-beam to accord with the desired pitch and rise of the roof. When the instrument is not in use, the parts thereof may be folded in compact condition, as seen in Fig. 6, for transportation or storage.

From the foregoing it is apparent that I produce a simple device admirably adapted for the attainment of the ends in view, it being understood that minor changes in the details herein set forth may be resorted to without departing from the spirit of the invention.

Having thus fully described my invention, what I claim is—

In a measuring instrument, a frame comprising a base-bar, a graduated end bar pivotally connected therewith, and a connecting-bar pivoted to the base-bar, said end bar and connecting-bar being adapted to fold upon the base-bar, interengaging devices provided at the normally free ends of the connecting and end bars, and a graduated gage-bar pivoted in the frame and adapted to move over the graduated end bar.

In testimony whereof I affix my signature in presence of two witnesses.

HARRY S. MILKS.

Witnesses:
  HUGO FELIX,
  LEONARD BROWN.